United States Patent
Phillips et al.

(10) Patent No.: US 7,502,920 B2
(45) Date of Patent: Mar. 10, 2009

(54) HIERARCHICAL STORAGE ARCHITECTURE FOR RECONFIGURABLE LOGIC CONFIGURATIONS

(75) Inventors: Christopher E. Phillips, San Jose, CA (US); Dale Wong, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 512 days.

(21) Appl. No.: 10/728,551

(22) Filed: Dec. 4, 2003
(Under 37 CFR 1.47)

(65) Prior Publication Data
US 2005/0204122 A1   Sep. 15, 2005

Related U.S. Application Data

(63) Continuation of application No. 09/679,398, filed on Oct. 3, 2000, now abandoned.

(51) Int. Cl.
*G06F 9/00* (2006.01)
*G06F 15/177* (2006.01)

(52) U.S. Cl. .............................. 713/100; 713/1; 711/1; 326/37

(58) Field of Classification Search ............ 713/1, 713/2, 100; 711/1, 2, 3; 326/37
See application file for complete search history.

(56) References Cited

U.S. PATENT DOCUMENTS

| | | | | |
|---|---|---|---|---|
| 6,021,490 A | * | 2/2000 | Vorbach et al. | ............. 713/100 |
| 6,077,315 A | * | 6/2000 | Greenbaum et al. | ......... 717/157 |
| 6,091,263 A | * | 7/2000 | New et al. | ..................... 326/40 |
| 6,571,381 B1 | * | 5/2003 | Vorbach et al. | ............. 713/100 |
| 6,836,842 B1 | * | 12/2004 | Guccione et al. | ............ 713/100 |
| 6,996,709 B2 | * | 2/2006 | Arnold et al. | ................. 716/16 |

OTHER PUBLICATIONS

Hennessy John L. et al, Computer Organization and Design: The Hardware/Software Interface, 1998, Morgan Kaufmann Publishers, 2nd Ed., pp. 545-549.*

* cited by examiner

*Primary Examiner*—Mark Connolly
(74) *Attorney, Agent, or Firm*—Kacvinsky LLC (57) ABSTRACT

The present invention, generally speaking, provides a hierarchy of configuration storage. The highest level of the hierarchy is an active configuration store; the lowest level is an off-chip configuration store; in between are one or more levels of configuration stores. Every configuration is promoted from the lowest off-chip level, through each level, up to the highest active level. Each ascending level of the hierarchy has a decreasing latency time required to promote a configuration to the next higher level of the hierarchy, and a decreasing amount of available storage. This separation into levels allows the amount of available storage to be adjusted depending on the inherent latency of the level's storage mechanism, where a longer latency requires a larger cache. This in turn allows the total required storage for a given performance level to be minimized.

11 Claims, 8 Drawing Sheets

COMPRESS

| SCRATCHPAD | |
|---|---|
| PLANE | CONFIG. ADDR. |
| 0 | $A_0$ |
| 1 | $A_1$ |
|  |  |
| N | $A_N$ |

HIERARCHICAL STORAGE ARCHITECTURE FOR RECONFIGURABLE LOGIC CONFIGURATIONS

The present patent application is a Continuation of application Ser. No. 09/679,398, filed Oct. 3, 2000, now abandoned.

FIELD OF THE INVENTION

The present invention relates to reconfigurable computing.

STATE OF THE ART

A Field Programmable Gate Array (FPGA) is a single-chip combination of computing elements and storage elements. The computing elements can be configured to implement different logic functions depending on the values stored in the storage elements. A collection of such values that can configure all the computing elements on the chip will be referred to as a "configuration plane". A collection of values that is a subset of a plane will be referred to as a "configuration."

In a conventional FPGA, there is only enough on-chip storage for a single configuration plane. In a variant of FPGAs known as Reconfigurable Logic, there may be enough on-chip storage for multiple configuration planes. In reconfigurable logic there is typically some mechanism for rapidly changing which plane is currently configuring the computing elements. In addition, there is typically some mechanism for loading the multiple planes from off-chip storage, which can result in virtually unlimited configurations for the chip. However, the time required to load the off-chip configuration data is the bottleneck for current implementations.

The off-chip loading is typically handled by either a caching or a pre-fetch strategy. In a caching strategy, an on-chip cache of the most recently used configurations is stored, and in the event of a cache miss, the chip is stalled until the configuration can be loaded from off-chip. This is a delay of several hundreds of clock cycles for the current generation of reconfigurable logic. In a pre-fetch strategy, the overall schedule of configuration invocations is analyzed and the appropriate configurations are loaded into the configuration planes before they are needed, ideally avoiding stalling the chip. However, the more time required to load an off-chip configuration, the more branching in the configuration schedule will be encountered between the pre-fetch and the actual use, possibly invalidating the original pre-fetch decision and stalling the chip.

SUMMARY OF THE INVENTION

The present invention, generally speaking, provides a hierarchy of configuration storage. The highest level of the hierarchy is an active configuration store; the lowest level is an off-chip configuration store; in between are one or more levels of configuration stores. Every configuration is promoted from the lowest off-chip level, through each level, up to the highest active level. Each ascending level of the hierarchy has a decreasing latency time required to promote a configuration to the next higher level of the hierarchy, and a decreasing amount of available storage. This separation into levels allows the amount of available storage to be adjusted depending on the inherent latency of the level's storage mechanism, where a longer latency requires a larger cache. This in turn allows the total required storage for a given performance level to be minimized.

BRIEF DESCRIPTION OF THE DRAWING

The present invention may be further understood from the following description in conjunction with the appended drawing. In the drawing:

FIG. 2b is a compressed format used to represent the configuration of

FIG. 2a, the bits of the representation being further compressed;

FIG. 6b is a diagram of a group of corresponding memory cells, one cell form each plane of the memory stack of FIG. 6a;

FIG. 6c is a diagram of an alternative embodiment of the memory stack of

FIG. 6a in which separate "function" and "wire" stacks are provided;

FIG. 7 is a schematic diagram of an alternative embodiment for a single bit of the memory stack of FIG. 6a.

DETAILED DESCRIPTION OF THE PREFERRED EMBODIMENTS

Figure 1:
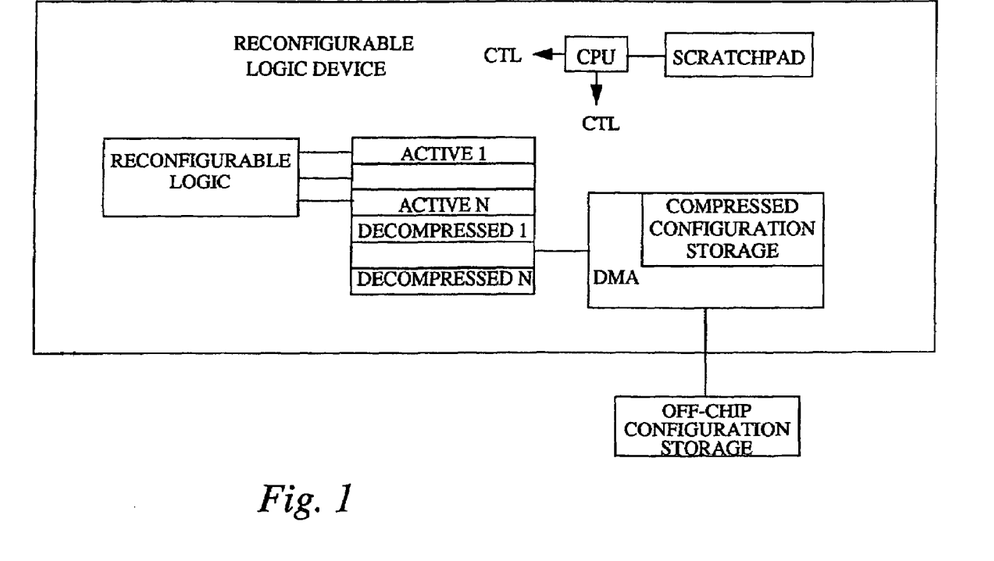
FIG. 1 is a diagram of an exemplary configuration storage hierarchy.

Referring now to FIG. 1, in a preferred embodiment of the present invention, an FPGA or reconfigurable logic device is provided with a configuration storage hierarchy having multiple levels, e.g., four levels: 1) off-chip storage, 2) compressed cache storage, 3) decompressed configuration planes, and 4) one or more active configuration planes. A description of each level follows, proceeding from lowest to highest level.

Off-Chip

The off-chip level of storage may be implemented in a variety of technologies, including without limitation EEPROM, RAM, hard drive, or I/O port. Preferably, the external storage device is memory mapped (corresponds to address entry in system CPU memory access space), and an instruction to load a specific configuration from off-chip storage device will include the configuration's starting address and length. The length of a configuration will vary depending on: how many computing elements it configures, the specific function for each computing element, and the amount of compression achieved.

A configuration may include an arbitrary number of computing and/or routing elements. Nor is there any restriction that the elements be contiguous on the chip. Partial reconfiguration may be used to support a "data-in-place" computing style where some computing elements configured as registers and holding active data are left untouched, while other computing elements are reconfigured to perform new functions on the data. Partial reconfiguration may be performed. For "data in place," storage contents are left in place at either/ or register and local memory elements. The control logic or wiring interconnectivity can be updated with new certification data while the rest of the configuration data fields for the storage remains unchanged. In a preferred embodiment, routing between elements can remain static while the control codes are updated. In both of these cases, selected subsets of configurations are used, resulting in effective benefits of partial reconfiguration.

Figure 2A:
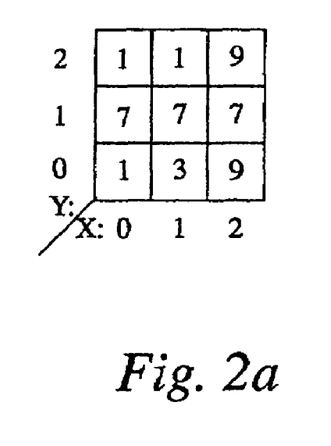
FIG. 2a is a simplified example of a configuration to be compressed.
Figure 2B:
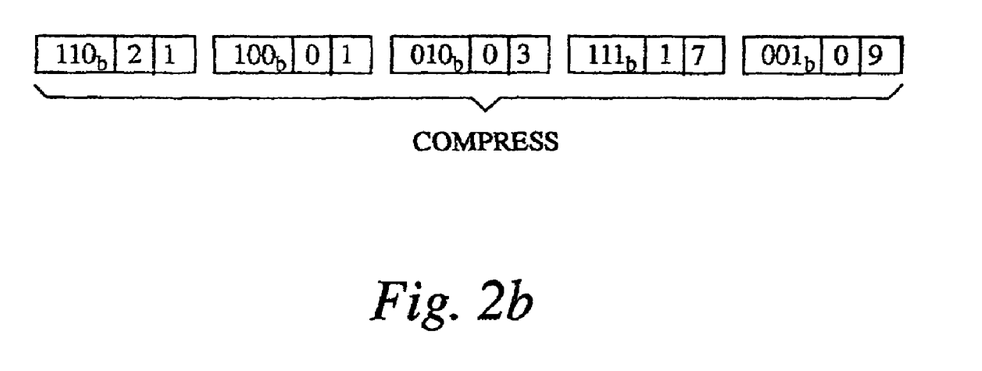

The off-chip configurations are stored in a compressed format. One possible compression scheme is described here. Referring to FIG. 2a, the computing elements on the chip are in a two dimensional X and Y array. A computing element is configured by storing an opcode (e.g., 1, 3, 7, etc.) in the computing element. Routing elements occupy rows and columns where all elements in a row have the same Y coordinate, and all elements in a column have the same X coordinate. Referring to FIG. 2b, a single configuration consists of a series of instructions, to be executed in sequence, all with the following three-field format: Y control, X control, opcode. The Y control is a binary number from 0 to N-1, where N is the maximum possible Y coordinate. The X control is an N bit wide word, where N is the maximum possible X coordinate. In other words, the X control has one bit for every column, and the Y control is decoded for each row. In the row enabled by the Y control, for each element in the row where the corresponding X control bit is a 1, the specified opcode will be loaded into the element. On top of this "common configuration" compression, the entire configuration (sequence of instructions) may be bit-wise run length compressed.

In an alternative implementation, the Y control may not be encoded if the savings from simultaneously loading multiple rows with the same opcode outweighs the savings from encoding the row coordinate.

In addition to being compressed, the configurations may also be encrypted.

The number of bits used to configure a single element may vary. It is possible to apply, for example, Huffman encoding to the set of possible configuration codes so that the more frequently used codes require fewer bits than the less frequently used codes. Even if a fixed bit-width is used for the opcode, maximizing the number of leading zeros will help in a run length compression scheme.

Compressed Cache

The on-chip compressed cache can be loaded directly from the off-chip configurations. The on-chip cache has its own dedicated DMA server. The configurations are loaded directly from off-chip without any modification, in compressed format. As a result, more configurations can be stored in a given amount of cache, and the off-chip loading time is minimized.

Figure 3:
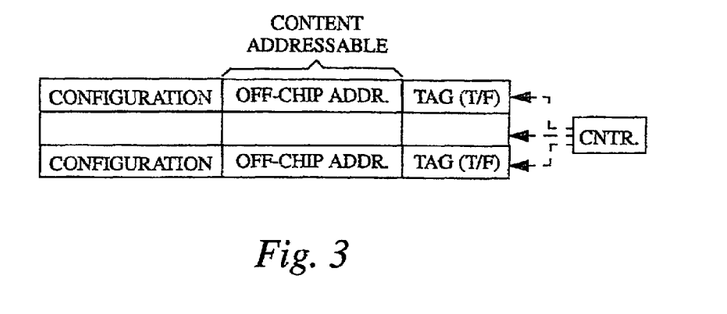
FIG. 3 is a diagram showing an example of a suitable on-chip cache.

Referring to FIG. 3, one possible implementation of the cache is as follows. The on-chip compressed cache may be implemented as a RAM with multiple cache "lines", where each line consists of a configuration field, a contents addressable field, and a tagged bit field. The contents addressable field will store the address of the configuration, which is the same as the off-chip address used to load the configuration. The tagged bit field is used during a search of the cache for a given configuration. The tag bit is set to TRUE for any line with an address field that exactly matches a searched for address, and is set to FALSE otherwise. Whenever a configuration is loaded into the cache, a search is performed first to check if there is already a line with the same address. If so, the off-chip configuration is loaded on top of the existing line in the cache. If not, the first available line is used. A separate counter with wrap around is maintained to indicate the first available line. If the first available line's address field is not equal to zero, an error flag is raised. When a line in the cache is freed, its address field is set to zero. Instead of a wrap around counter, an alternate method for identifying an available line is to search for a zero address and use the first available.

Decompressed Planes

The decompressed planes are loaded with configurations from the compressed cache, with stream-oriented decompression and decoding. Once they are in the decompressed planes, configurations can be moved into the active plane in as little as a single clock cycle. The decompressed planes serve as the rapid staging area for the active plane.

Figure 4:
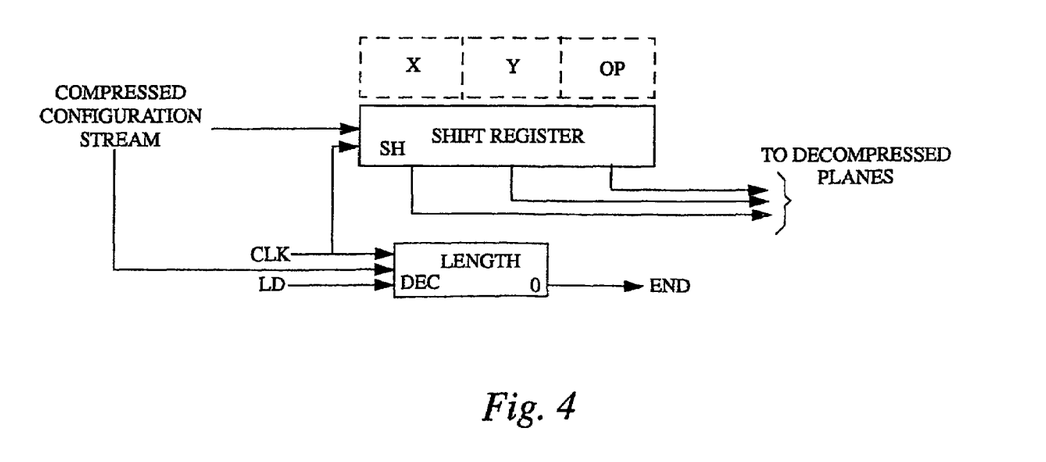
FIG. 4 is a diagram showing an example of decompression.

Referring to FIG. 4, one possible implementation of the decompression and decoding process is as follows. A fixed bit-width is assumed for the length field of the run-length compressed bitstream. The length field value is loaded into a count down counter. The next bit is shifted into a shift register until the counter reaches zero or the register is filled. The bit-width of the register corresponds to the length of a single configuration instruction. The instruction's X, Y, and opcode fields will have been zero-filled so that the fields are always the same bit-width. When the register is filled, the fields will drive the loading of the decompressed plane accordingly. The process continues until a length field of zero is encountered.

If the configuration instructions are encrypted, they will be decrypted after each configuration instruction is decompressed. In this case, local hardware would intervene to perform the decryption before the disbursement in the configurable storage planes.

Figure 5:
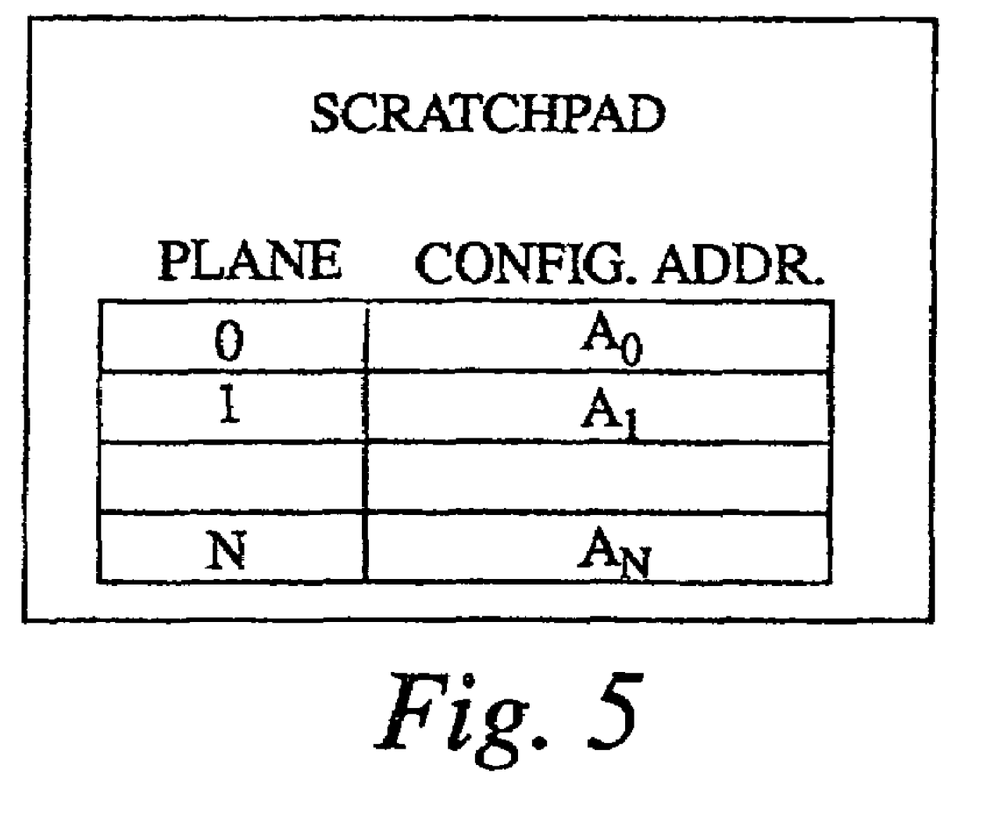
FIG. 5 is a diagram showing an example a of planes/configuration table.

Referring to FIG. 5, a separate table is maintained that stores the address of the configuration that is currently loaded in each decompressed plane. While the chip is executing, this table can be used to verify that the intended configurations have actually been pre-fetched and are still resident in the planes. This table can also be used to save and restore the state of the chip in the event of an interrupt. This table can also be used to boot some initial configurations into the chip during power-up.

Active Plane

Figure 6A:
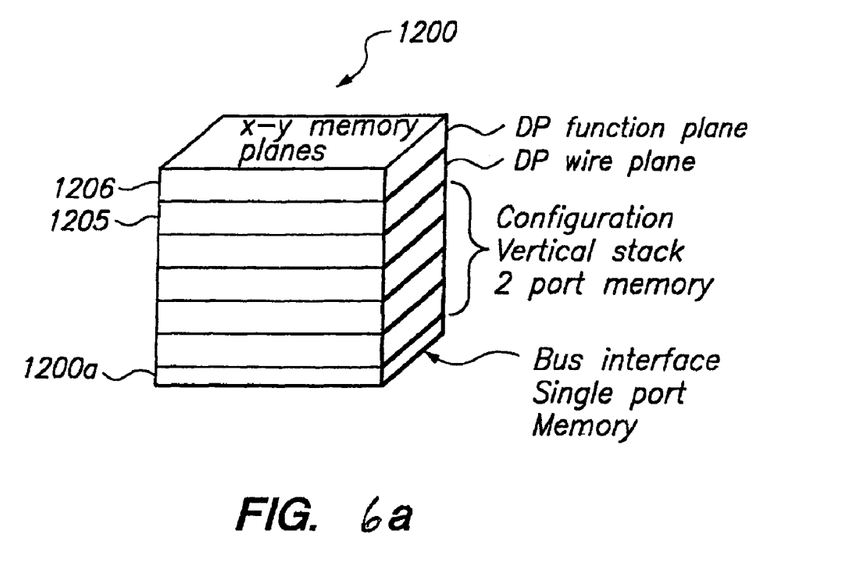
FIG. 6a is a block diagram of a portion of a memory plane stack.

The active plane can be loaded from any of the decompressed planes. A particular embodiment of a memory plane stack 1200 is shown in FIG. 6a. In the illustrated example, the top two planes 1206, 1205 of the memory plane stack are configuration planes. Configuration data stored in these planes is applied to the reconfigurable logic. In the illustrated embodiment, "function" configuration data and "wire" configuration data is stored in different planes. The bottom memory plane 1200a provides external access to the memory stack. Intermediate planes function, for example, as a configuration stack, storing configurations expected to be used by not presently active. In an exemplary embodiment, memory plane 0 is single port, for single-channel read and write between system memory and configuration storage. The remaining memory planes are dual port, having one read port and one write port. Dual port supports simultaneous loading and recirculation of configuration data with the local "stack." If no data compression is used, then simultaneous real-time monitoring is possible, e.g., by writing out a "snapshot" of one or more planes of the stack.

Figure 6B:
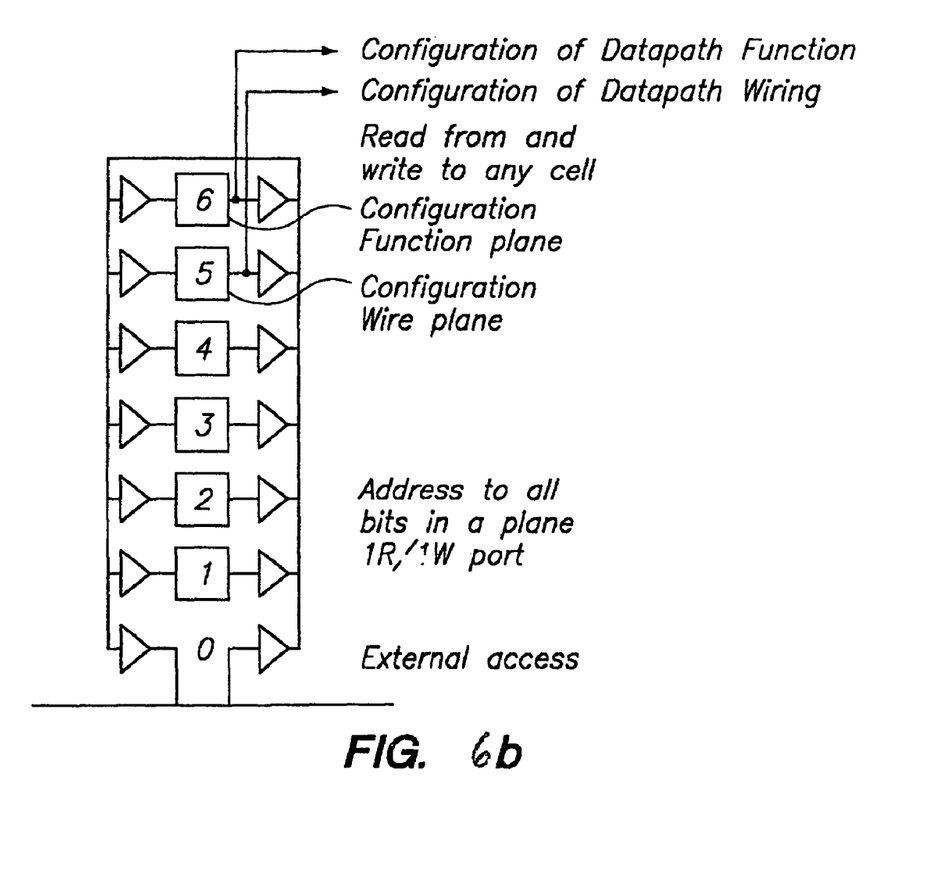

A group of corresponding memory cells, one cell from each plane of the memory stack, is shown in FIG. 6b. The ports of all of the cells are interconnected so as to allow an operation in which the contents of a cell within any plane may be read and then written to the corresponding cell of any other plane. For example, by activating the appropriate control signal, the contents of plane 4 may be read and written into plane 6. Such an operation may be accomplished, preferably, in a single clock cycle, or at most a few clock cycles. Configuration data is loaded from external main memory into plane 0 of the memory stack in anticipation of its being transferred into a configuration plane.

Figure 6C:
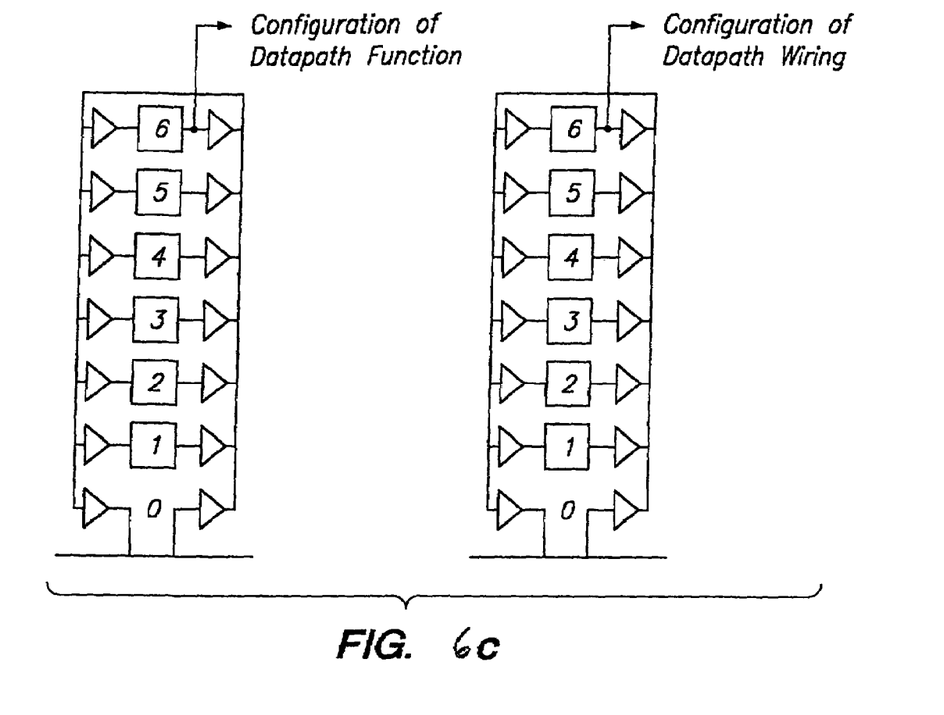
Figure 6D:
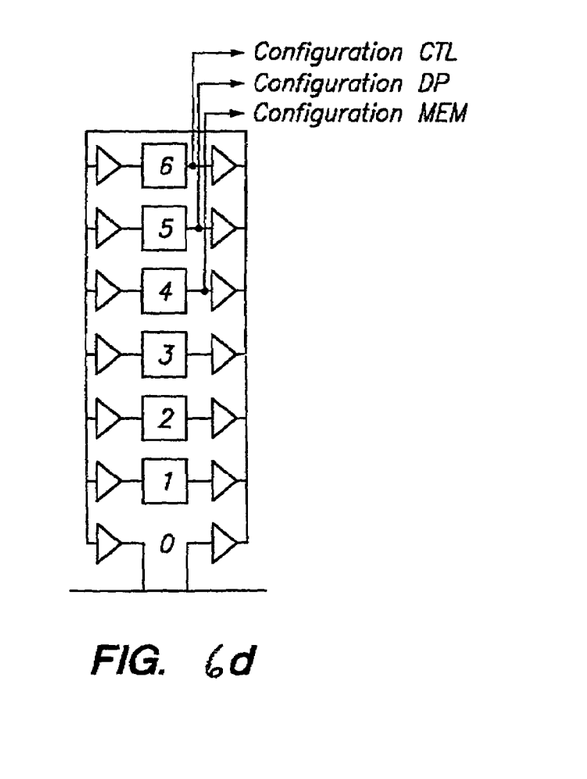
FIG. 6d is a diagram of separate memory stacks provided for control, datapath and memory configuration, respectively.
Figure 6E:
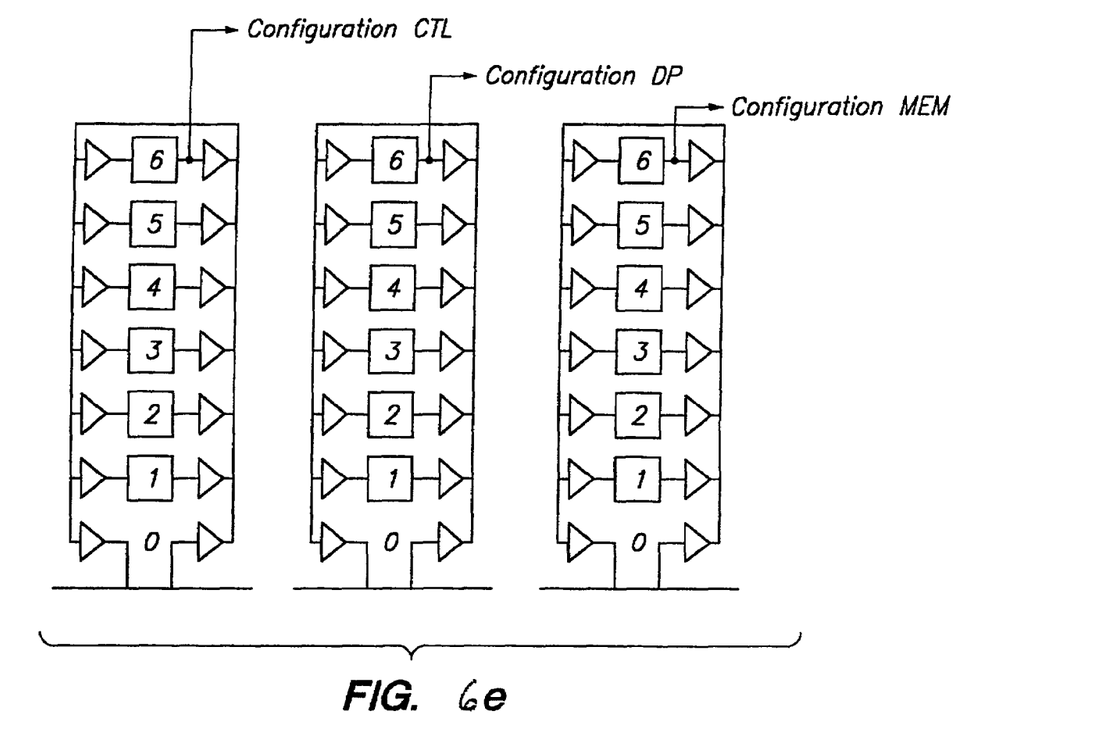
FIG. 6e is a diagram of a common memory stack provided for control, datapath and memory configuration.

Alternatively, separate "function" and "wire" stacks may be provided, as shown in FIG. 6c. Using this arrangement, function and wire configurations may be changed simultaneously. Similarly, configuration stacks for configuration of control, datapath and memory may be combined (FIG. 6d) or separate (FIG. 6e).

Figure 7:
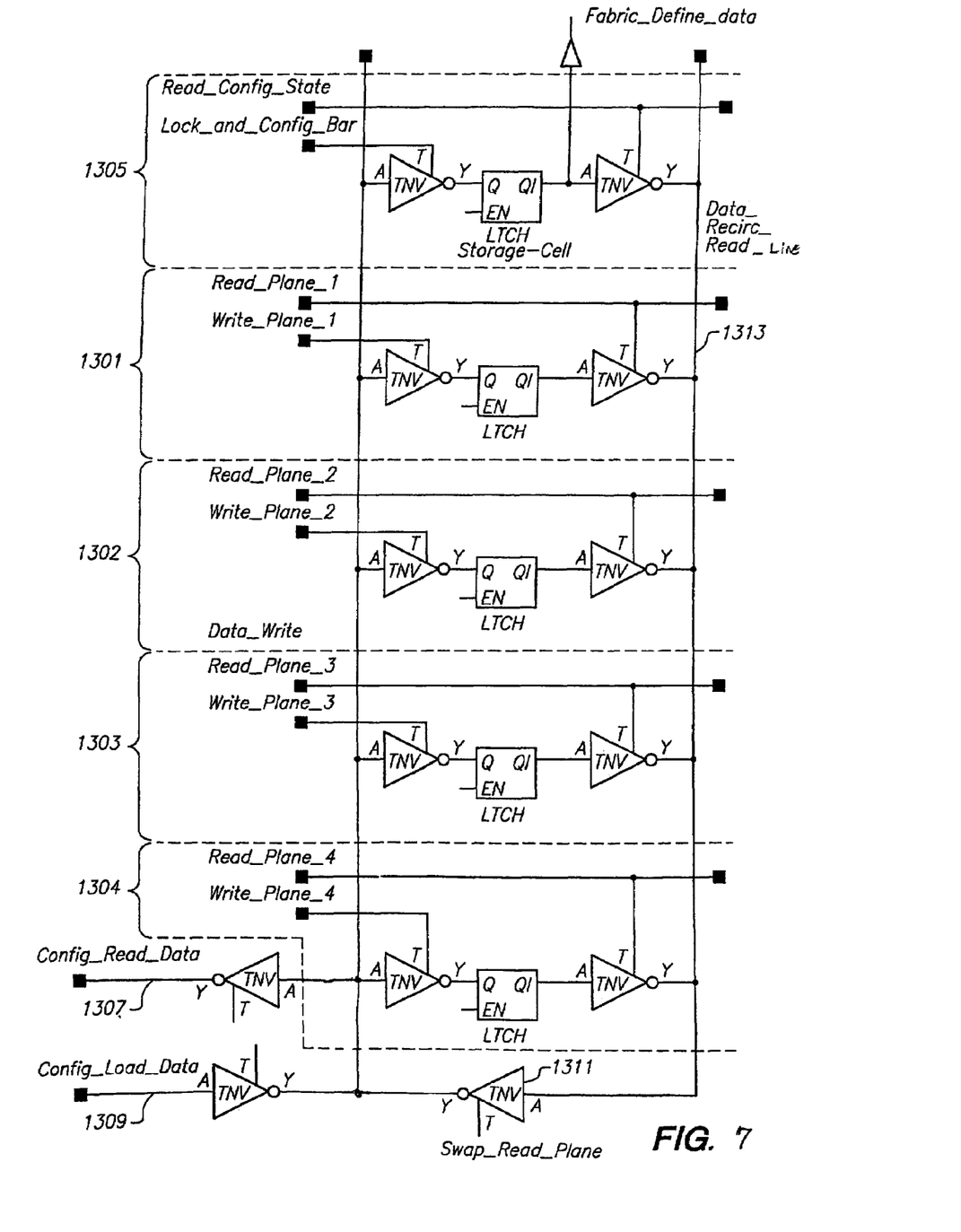

A schematic diagram of an alternative embodiment of a cell stack is shown in FIG. 7, showing a cross section of several configuration planes 1301-1304 and the lockable fabric-definition cell 1305 that produces a Fabric_Define_Data bit for a single bit location. These bits are aggregated in order to form sufficient bit numbers for functional cell type definition. For instance, a four bit grouping might designate between four to sixteen different cell type definitions. The other latch sites below the storage cell are for additional configuration plane data available for swapping as needed by functional scheduling requirements. These storage locations can be written and read to from a common configuration data bus structure. The Config_Read_Data and Config Load_Data buses 1307 and 1309, although shown as being separate, can be combined as a single bi-directional bus for wiring efficiency. This bus structure allows configuration data to be written as needed. The Swap_Read_Plane buffer 1311 allows existing configuration plane data contents to be swapped among differing configuration planes on a selectable basis. For instance, the current operation plane of data can be loaded from configuration plane 1 to configuration plane 2 by the use of the Swap_Read_Plane buffer 1311. The structure shown in FIG. 7 is similar to a conventional SRAM memory structure which allows a dense VLSI circuitry implementation using standard memory compiler technology. This structure could also be implemented as a conventional dual port RAM structure (not shown) which would allow for concurrent operation of the write and read data operations. Unlike FIG. 6b, the example of FIG. 7 assumes separate configuration stacks for each configuration plane as described hereinafter. That is, the bit stack produces only a single Fabric_Define_Data bit instead of multiple fabric definition data bits as in FIG. 6b. The bits could also be extended to include registers operating in a like fashion.

If the Data_Recirc_Read line 1313 is also connected to data storage locations that are used for normal circuit register operation, then real time monitoring of device operations can be utilized by the operating system for applications such as RMON in internetworking application area or for real time debug capability. The RMON application basically uses counter operation status from registers in order to determine system data operation flow characteristics.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. In a reconfiguration computing system including a reconfigurable computing chip having reconfigurable logic and multiple configuration planes, the system further including off chip storage, a method of configuration management, comprising:
   storing in a table a current state of the on-chip configurations, said table comprising multiple entries, each entry identifying an on-chip configuration plane and identifying a unique off-chip address of a loaded configuration;
   saving the table, to save up to an entire state of the reconfigurable logic:
   loading the table; and
   loading the identified configurations into the identified on-chip configuration planes from information stored in the table.

2. The method of claim 1, further comprising establishing initial boot conditions in the reconfigurable logic by:
   specifying in the table an address of a boot configuration; and
   automatically loading the boot configuration into the reconfigurable computing chip on boot up.

3. A method comprising:
   populating a memory having a plurality of entries, one or more of such entries being associated with a configuration plane of an associated reconfigurable chip, such entries identifying an on-chip configuration plane and an associated off-chip address of a loaded configuration, wherein the plurality of entries within the memory is associated with a table;
   saving the table to preserve up to an entire state of the reconfigurable chip:
   loading the table; and
   loading one or more identified configurations into one or more identified planes of the reconfigurable chip from information stored in the table.

4. A method according to claim 3, further comprising:
   selectively loading a configuration in a configuration plane; and
   unloading an active configuration from an active configuration plane.

5. A method according to claim 4, further comprising:
   activating the configuration plane including the loaded configuration.

6. A method according to claim 3, further comprising:
   establishing one or more boot conditions in the reconfigurable logic.

7. A method according to claim 6, the element of establishing boot conditions comprising:
   specifying in the table an address of a boot configuration, and
   selectively loading the boot configuration into a configuration plane of the reconfigurable chip upon receiving an indication of a boot condition.

8. A system comprising:
   a reconfigurable chip including reconfigurable logic and multiple configuration planes, the reconfigurable chip including a configuration table with multiple entries in which to store configuration content, wherein one or more of such entries are associated with a configuration plane and identify an off-chip address of a loaded configuration; and
   a memory system, coupled with the reconfigurable chip, to store at least a subset of the configurations associated with configuration planes of the reconfigurable chip;
   wherein the reconfigurable chip selectively saves the table to save up to an entire state of the reconfigurable logic, selectively loads the table, and selectively loads configuration information from the loaded table to configure one or more configuration planes comprising the reconfigurable chip.

9. A system according to claim 8, wherein the memory system is one or more memory devices.

10. A system according to claim 8, wherein the memory system is co-located with the reconfigurable chip within a system chassis.

11. A system according to claim 8, wherein at least a subset of entries in the table are associated with a boot configuration for the reconfigurable chip, and wherein a pointer to the boot configuration is set upon detection of a boot event to load the boot configuration into a configuration plane of the reconfigurable chip.

* * * * *